(No Model.) 3 Sheets—Sheet 1.

A. T. MILLER.
TAPPING MACHINE.

No. 377,400. Patented Feb. 7, 1888.

WITNESSES:
N. R. Kennedy,
F. T. Chapman

INVENTOR
Allen T. Miller,
BY Phil. T. Dodge
ATTORNEY

N. PETERS, Photo-Lithographer, Washington, D. C.

(No Model.) 3 Sheets—Sheet 2.
A. T. MILLER.
TAPPING MACHINE.
No. 377,400. Patented Feb. 7, 1888.
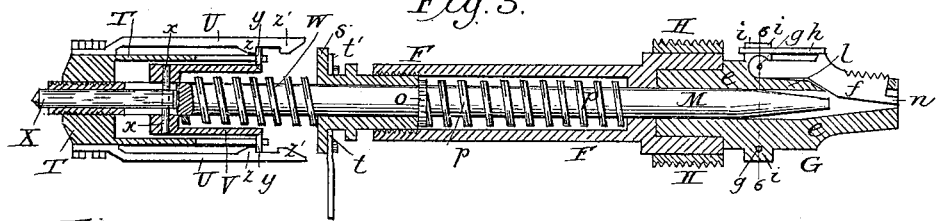
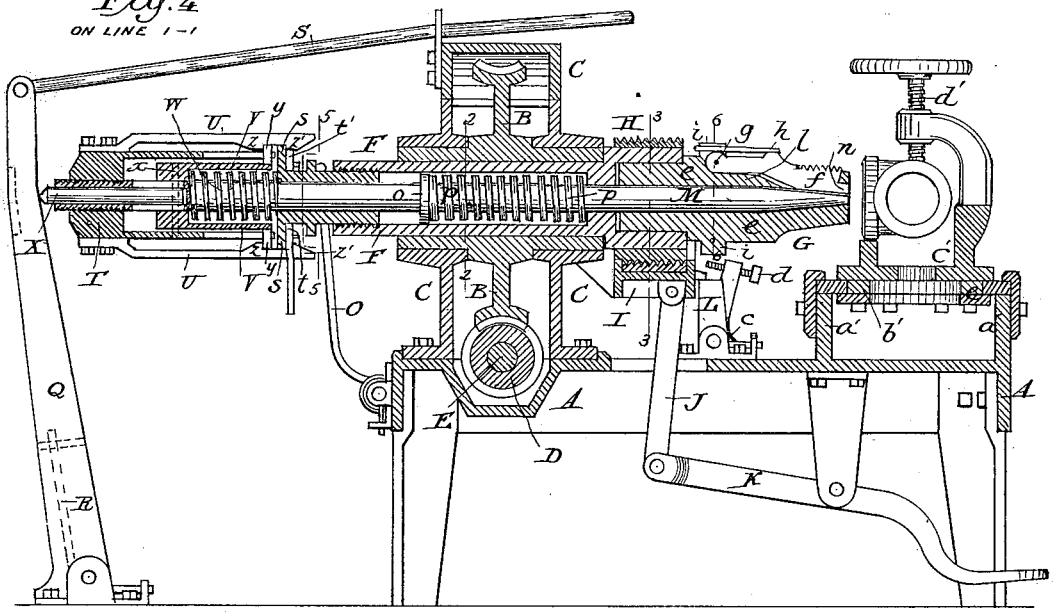
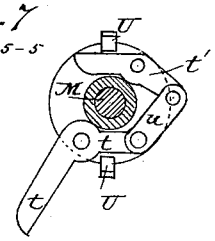
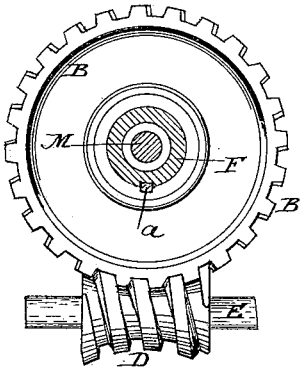
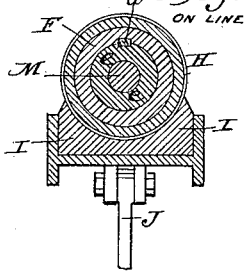
WITNESSES:
N. R. Kennedy,
F. T. Chapman
INVENTOR
Allen T. Miller
BY
Phil T. Dodge
ATTORNEY (No Model.) 3 Sheets—Sheet 3.

A. T. MILLER.
TAPPING MACHINE.

No. 377,400. Patented Feb. 7, 1888.

ON LINE 6—6.

WITNESSES:
W. R. Kennedy.
F. T. Chapman

INVENTOR
Allen T. Miller,
BY
Phil. T. Dodge.
ATTORNEY

UNITED STATES PATENT OFFICE.

ALLEN T. MILLER, OF GREENVILLE, OHIO, ASSIGNOR TO GEORGE F. KUHNS, WILLIAM N. KUHNS, AND HENRY B. KUHNS.

TAPPING-MACHINE.

SPECIFICATION forming part of Letters Patent No. 377,400, dated February 7, 1888.

Application filed May 20, 1887. Serial No. 238,878. (No model.)

*To all whom it may concern:*

Be it known that I, ALLEN T. MILLER, of Greenville, in the county of Darke and State of Ohio, have invented certain Improvements in Tapping-Machines, of which the following is a specification.

My invention relates to a machine in which an expanding tap is used in connection with a longitudinal spindle, and with devices by which the tap is automatically advanced during the cutting operation and contracted and withdrawn at the completion of the operation.

It consists of various improvements relating to the feeding mechanism and to the means for supporting the articles to be operated upon, as hereinafter more fully explained.

Figure 1:
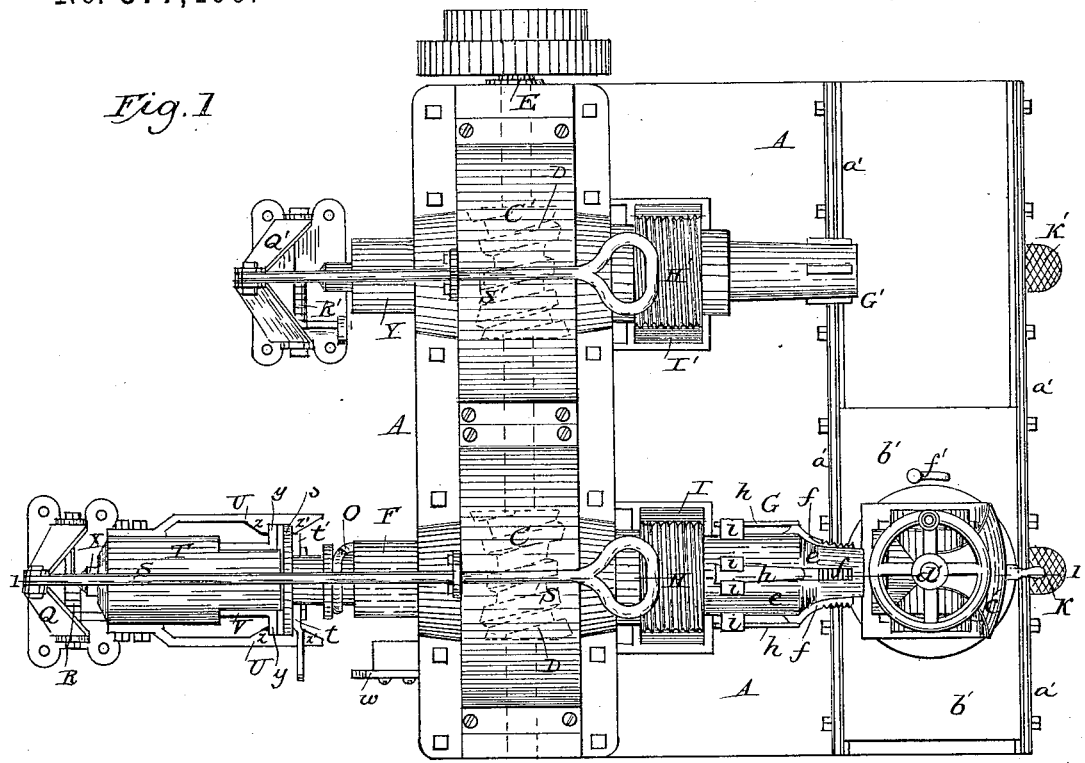
Figure 2:
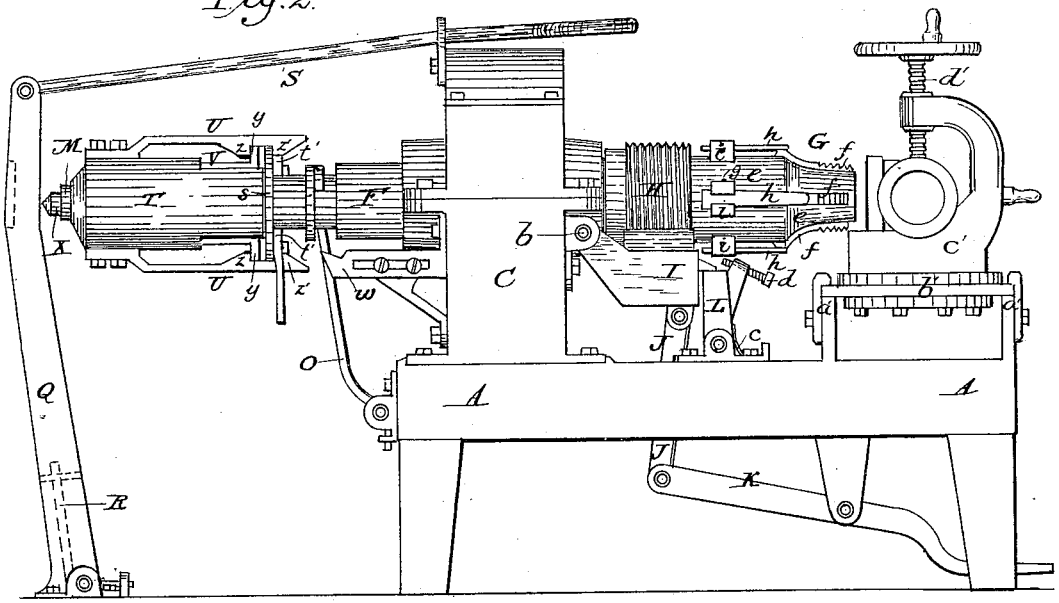
Figure 8:
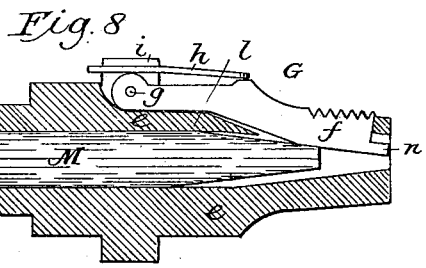
Figure 9:
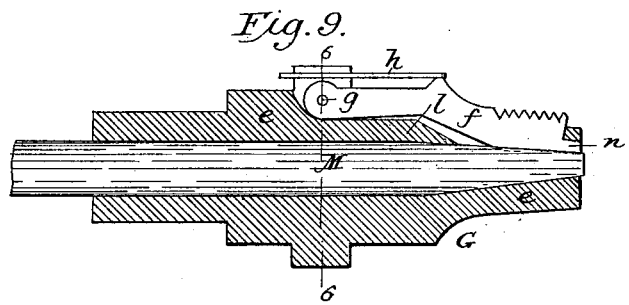
Figure 10:
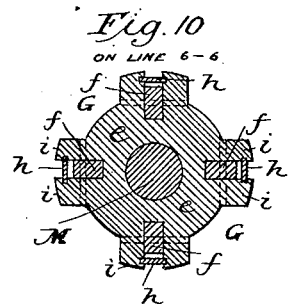
Figure 11:
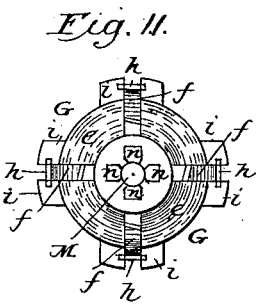
Figure 12:
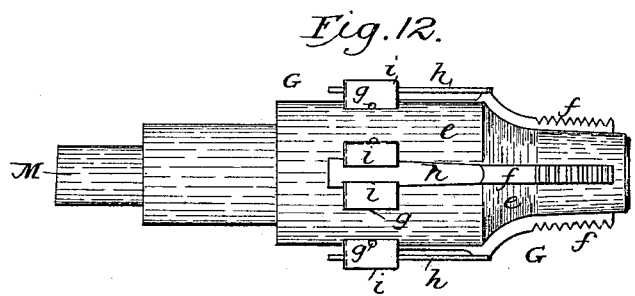

In the accompanying drawings, Figure 1 represents a top plan view of my machine. Fig. 2 is a side elevation of the same. Fig. 3 is a longitudinal section through the tap, its operating-spindle, and adjacent parts. Fig. 4 is a longitudinal vertical section through the machine on the line 1 1 of Fig. 1. Fig. 5 is a cross-section on the line 2 2, Fig. 4, showing the worm-gear for operating the spindle. Fig. 6 is a cross-section on the line 3 3. Fig. 7 is a section on the line 5 5. Figs. 8 and 9 are axial sections through the tap in its expanded and contracted conditions, respectively. Fig. 10 is a cross-section on the line 6 6 of the preceding figures. Fig. 11 is an end view of the tap. Fig. 12 is a side view of the same.

Referring to the drawings, A represents a rigid base-frame; B, a worm-wheel with horizontal tubular journals mounted and arranged to revolve within standards C on the frame. This wheel receives continuous motion from a worm, D, on a cross-shaft, E.

F is a hollow spindle or stock passing through the worm-wheel and connected therewith by a spline, $a$, or equivalent connection, through which it receives a rotary motion, while permitted to move freely in an endwise direction. The forward end of this spindle carries the expansible tap or cutter G, hereinafter described, and is provided with a threaded collar, H, fixed thereon and arranged to engage a half-nut, I, having arms jointed to the main frame at $b$, so that when in engagement with the collar H it will cause the rotating spindle to move gradually forward. The nut is connected by a link, J, to a treadle, K, or other lever, through which it is thrown into operative position. A latch, L, pivoted to the main frame and acted upon by a spring, $c$, engages automatically with the nut when the latter is elevated, and thus locks it in engagement with the collar H. As the spindle advances its collar H encounters an adjustable screw, $d$, in the upper end of the latch L, and at the proper instant effects the automatic disengagement of the latch and the release of the nut I, so that the spindle may be retracted by a spring-arm, O, which is attached at one end to the frame and arranged to act at the opposite end against a collar on the rear end of the spindle. The screw $d$, which is not a necessary part of the machine, serves as a means of regulating the distance to which the spindle advances.

The tap G, as shown in the drawings, consists of a tubular body, $e$, provided at its forward end with three longitudinal grooves to receive the cutting-jaws $f$, which are attached thereto at their rear ends by pivots $g$ in such manner that their forward toothed ends may swing inward and outward. Springs $h$ bear at one end on the outer sides of the jaws midway of their length, urging them inward. At their opposite ends these springs are driven tightly into and carried by grooved studs $i$, formed on the outside of the body. A sliding rod, M, extending through the spindle and the body of the tap, has its forward end tapered and arranged to bear against the inner surfaces of the pivoted jaws at their forward ends. When moved forward, as in Figs. 4, 9, and 12, it forces the jaws outward and supports them rigidly in their operative position. When withdrawn, it permits them to swing inward under the influence of the springs, as shown in Figs. 3 and 8, so that they may be directly withdrawn from the opening in which they have formed a thread.

I am aware that contracting taps with pivoted jaws are old in various forms; but it is to be noted as a peculiarity of my tap that the jaws are made of a bent form and their rear ends thrown outward, so that the slots which receive them require to be cut entirely through the body of the tap at the forward end only, where the jaws are required to come in contact with the rod M. I am thus enabled to leave in the body the metal at the points $l$. This metal tying together the walls of the slots gives to the body a much greater strength and rigidity than it would otherwise have, and enables me to support the cutters in such manner that there is no danger of their springing or twisting out of line, as commonly happens with taps constructed in the ordinary manner.

The slots which receive the jaws terminate before reaching the forward end of the body, which is thus left intact, its forward end forming a complete ring, against which lips $n$ in the forward end of the jaws seat themselves, as shown in Fig. 9, thus limiting the outward motion of the jaws and assisting to hold them in position when the rod is driven forward.

In order to retract the rod it is provided inside of the spindle F with a collar, $o$, and encircled by a spiral spring, $p$, which bears at one end against this collar and at the opposite end against a shoulder in the spindle.

The rod M is moved forward to expand the tap by means of a lever, Q, pivoted to the floor or other support, urged rearward by a spring, R, and provided at the upper end with a rod, S, by which the operator may pull it forward against the end of the spindle when required.

In order to hold the rod forward and maintain the tap in its expanded condition, a collar, T, is screwed adjustably on the rear end of the rod and provided with two spring-hooks, U, adapted and arranged to engage automatically with a collar, $s$, on the rear end of the spindle F, as shown in Fig. 4. In order to automatically disengage these hooks and permit the rod M to move backward under the influence of the spring $p$ when the tap has completed its action, I pivot on the collar $s$, in position to bear againt the inner faces of the engaged hooks U of the spindle F, two levers, $t$ and $t'$, connected by a link, $u$, as shown in Fig. 7. The lever $t$ is extended, as shown, and the frame provided with an adjustable arm, $w$, as shown in Figs. 1 and 2, in such position that the lever $t$, revolving and moving forward with the spindle, will encounter the plate $w$ at the proper time, and, being actuated thereby, will disengage the hooks U from the collar $s$, thereby releasing the rod M, so that it may move to to the rear.

The plate $w$ is slotted and secured to the frame by screws, as shown, or otherwise attached thereto, to admit of its horizontal adjustment, so that it may be caused to effect the disengagement of the parts sooner or later, according to the depth of the hole which is to be tapped.

The above parts constitute in themselves a complete operative organization. It may sometimes occur that the friction of the cutter $f$ upon the rod M will be such as to prevent the rod from retreating under the influence of the spring $p$ when released. I therefore provide means for imparting to the rod a sharp blow in a backward direction to jar it loose in the event of its failing to start when released. To this end I mount loosely around the rear end of the rod a hollow sleeve or striker, V, urged constantly rearward by a spring, W, encircling the rod and bearing at its ends against the rear end of the spindle F and against the sleeve, respectively. A center pin, X, extending loosely into the rod from the rear end, is connected by a cross-pin, $x$, with the sleeve, the rod being slotted to receive this pin, so that the sleeve may slide to and fro. At its forward end the sleeve or striker V has a flange, $y$. The hooks U are so formed as to engage this flange and carry the striker forward and lock it in its forward position at the same time that they engage the flange $s$ to hold the rod M forward. The hooks have their rear shoulders, $z$, which engage the collar $y$, of greater height than the shoulders $z'$, which engage the collar $s$. When, therefore, the parts are locked in their operative position, as shown in Fig. 4, the unlocking-levers $t$ and $t'$ will act to disengage the hooks U from the collar $s$ before they are disengaged from the collar $y$ of the striker.

If the rod retreats instantly under the influence of the spring $p$, the hooks U will remain in engagement with the flange of the striker and the parts will move rearward together, as shown in Fig. 3. If, however, the rod M is held by the friction of the cutting-jaws so that it does not move rearward when the hooks U are disengaged from the collar $s$, the arms $t$ and $t'$, continuing their action, will urge the hooks U outward until they disengage the collar $y$, the effect of which will be to release the striker V, which will immediately be driven rearward by the spring W and caused to strike with violence on the collar T on the rear end of the rod. This blow will have the effect of loosening the rod, so that it may be moved rearward by the spring. The essence of my invention in this regard lies in the use of a supplemental striker and devices for releasing the same whenever the rod fails to move rearward at the proper time.

It will be apparent to the skilled mechanic that the details may be variously modified without passing beyond the limits of my invention.

As it is frequently desirable to ream or bore out the openings previous to the tapping operation, or otherwise operate on the said openings, I mount on the main frame parallel with the tapping-spindle a second spindle, Y, which is mounted and driven in precisely the same manner as the tapping-spindle, the corresponding parts connected with the reaming-spindle being indicated by like letters of a higher power. The worm for driving the reaming-spindle is mounted on the same shaft that carries the worm for driving the tapping-spindle, as indicated by dotted lines.

For the purpose of supporting the articles which are to be tapped and of presenting them properly to the two spindles, I provide the main frame with horizontal ways or guides $a'$, and mount thereon a sliding bed-plate, $b'$, supporting a clamp or turret, c', having a screw or equivalent device, d', for fixing the articles in position thereon. The turret is swiveled or jointed to the bed-plate, as shown at e', so that it may revolve in a horizontal direction in order to present the different sides or faces of the objects to be tapped to the spindle. This arrangement is particularly advantageous in tapping pipe-elbows, T's, &c. A latch or locking device, f', of any suitable construction, will be provided to hold the turret in its different positions.

Having thus described my invention, what I claim is—

1. The combination, substantially as described, of the driving-wheel B, the sliding spindle having the threaded collar, the movable nut to engage the collar, and the latch to hold the nut, whereby the spindle is advanced and automatically released at the proper time.

2. In combination with the spindle having the threaded collar, the nut to engage the collar, the treadle or lever, and an intermediate connection for placing the nut in engagement, the spring-actuated latch to hold the nut, and the spring to retract the spindle, whereby the action of the treadle will cause the rotating spindle to advance to the required point and then retreat.

3. The tubular spindle and the tap or cutter with movable jaws, in combination with the central sliding rod to move the jaws, the spring to retract the rod, the catches to hold the rod forward, and devices, substantially as shown, to disengage the catches when the spindle has advanced the predetermined distance.

4. The sliding spindle and the tap with movable cutters, in combination with the central sliding rod, its retracting-spring, a catch, U, to connect the rod and spindle and hold the former forward, a lever, t, pivoted to the spindle to trip the catch, and a stationary stop to encounter and actuate said lever, substantially as described.

5. In combination with the spindle, the tap with movable cutters, the sliding rod, the spring to retract the same, the two catches to hold the rod forward, the two connected levers t t', and a stop or trip, w, to actuate said levers, whereby the contraction of the tap is automatically effected when it has advanced to the predetermined point.

6. The tap having movable cutters, the central sliding rod, and the spring to retract the rod, in combination with the independently-movable striker and its actuating-spring, whereby the rod may be driven backward if held by the friction of the cutters.

7. The spindle, the tap or cutter with movable jaws, the sliding rod to expand the tap, and the spring p, to retract the rod, in combination with the independently-movable striker, its actuating-spring, and a catch, U, to hold the rod and the striker in their forward positions, whereby the pressure of the spring p and the impact of the striker may both be applied to move the rod rearward.

8. In combination with the spindle, the contractile tap, the sliding rod, and the retracting-spring, the independently-movable striker, its actuating-spring, and the catch U, attached to the rod and adapted to engage both the striker and the spindle, its construction being such, as shown, that it may disengage from the spindle before disengaging from the striker, whereby the rod may be released and subjected to the influence of its retracting-spring before the striker is permitted to act.

9. In combination with the spindle, the contractile tap, the central rod, and the spring p, the striker and its actuating-spring, the catch U, having its shoulders constructed, as shown, to disengage from the spindle while retaining their engagement with the striker, the lever t, mounted on the spindle to disengage the catch, and a stop or trip, w, to actuate the lever, whereby the rod is automatically released and subjected to the influence of its retracting-spring and subsequently subjected to the action of the striker when and only when it fails to move under the influence of said retracting-spring.

10. In a tap or cutter, the jaws pivoted at their ends, in combination with the body grooved longitudinally to receive said jaws, said body being left intact beneath the pivoted ends of the jaws, as shown at l, whereby the springing and twisting of the parts is prevented.

11. In a tap or cutter, the tubular body provided with longitudinal grooves which open through to the center at their forward ends only, in combination with the angular or bent cutters extended at their forward ends into the central opening and pivoted at their rear ends in the outer part of the body, where the grooves do not extend through to the exterior, whereby the cutters are rigidly sustained.

12. In combination with the tap-body having the longitudinal grooves and the unbroken forward end, the pivoted jaws or cutters seated in said grooves and encircled at their forward ends by the body, and the sliding rod whereby the jaws may be forced outward and seated at their inner ends against the interior of the body.

13. The tap-body provided with the longitudinal grooves and the external grooved studs, in combination with the pivoted jaws or cutters, and the springs seated in said studs and acting upon the jaws, substantially as described.

In testimony whereof I hereunto set my hand this 29th day of March, 1887, in the presence of two attesting witnesses.

ALLEN T. MILLER.

Witnesses:
THEO. MENCHE,
HARRY H. PRUGH.